US007613608B2

(12) United States Patent
Bollano et al.

(10) Patent No.: US 7,613,608 B2
(45) Date of Patent: Nov. 3, 2009

(54) METHOD AND CIRCUIT FOR NOISE ESTIMATION, RELATED FILTER, TERMINAL AND COMMUNICATION NETWORK USING SAME, AND COMPUTER PROGRAM PRODUCT THEREFOR

(75) Inventors: Gianmario Bollano, Turin (IT); Donato Ettorre, Turin (IT); Rodrigo Pousas Navarro, Turin (IT)

(73) Assignee: Telecom Italia S.p.A., Milan (IT)

( * ) Notice: Subject to any disclaimer, the term of this patent is extended or adjusted under 35 U.S.C. 154(b) by 712 days.

(21) Appl. No.: 10/579,058

(22) PCT Filed: Nov. 12, 2003

(86) PCT No.: PCT/EP03/12629

§ 371 (c)(1), (2), (4) Date: May 11, 2006

(87) PCT Pub. No.: WO2005/050623

PCT Pub. Date: Jun. 2, 2005

(65) Prior Publication Data

US 2007/0055506 A1 Mar. 8, 2007

(51) Int. Cl.
*G10L 21/02* (2006.01)
*G10L 19/14* (2006.01)
*G10L 15/20* (2006.01)

(52) U.S. Cl. ........................ 704/226; 704/225; 704/233

(58) Field of Classification Search ....................... None
See application file for complete search history.

(56) References Cited

U.S. PATENT DOCUMENTS 4,811,404 A * 3/1989 Vilmur et al. ............. 381/94.3

(Continued)

FOREIGN PATENT DOCUMENTS

EP 0 809 842 12/1997

(Continued)

OTHER PUBLICATIONS

McAulay et al., "Speech Enhancement Using a Soft-Decision Noise Suppression Filter", IEEE Transactions on Acoustics, Speech and Signal Processing, vol. 28, Issue 2, Apr. 1980, pp. 137-145.*

(Continued)

*Primary Examiner*—David R Hudspeth
*Assistant Examiner*—Brian L Albertalli
(74) *Attorney, Agent, or Firm*—Finnegan, Henderson, Farabow, Garrett & Dunner, L.L.P.

(57) ABSTRACT

A filter such as a Wiener filter for noise reduction in a signal, such as a speech signal, affected by background noise includes a circuit for determining values of an update function relating new value of estimated noise power to a previous value of estimated noise power, the update function being a function of said previous estimated noise power and a mean input power spectral density. The circuit includes a look-up table having values for the update function stored therein with the previous value of estimated noise power and the mean input power spectral density as a first and a second search entry, respectively. These search entries are entered via an input module and exploited by search circuitry associated with the look-up table for selectively searching values for the update function in the look-up table. The search is preferably carried out on the basis of an index computed starting from said first and second search entries.

19 Claims, 5 Drawing Sheets

U.S. PATENT DOCUMENTS

Figure 1:
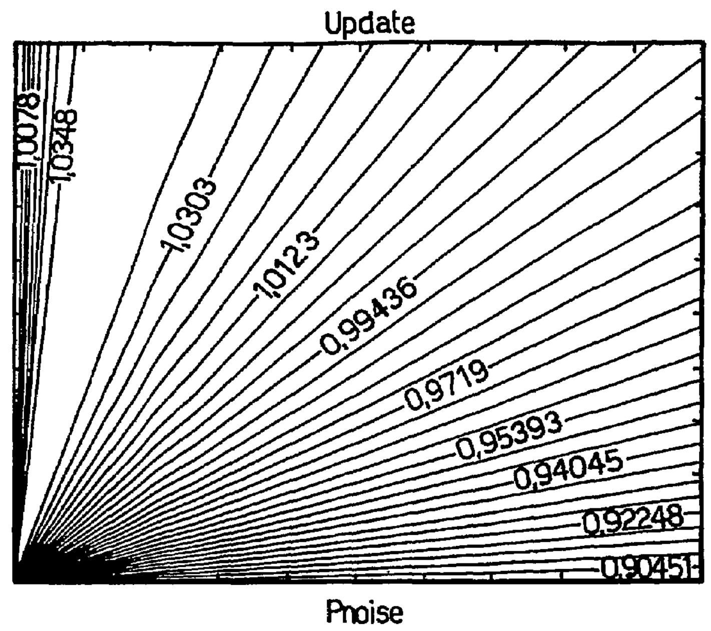

| | | | | |
|---|---|---|---|---|
| 5,012,519 | A | 4/1991 | Adlersberg et al. | |
| 5,632,003 | A * | 5/1997 | Davidson et al. | 704/200.1 |
| 5,781,883 | A * | 7/1998 | Wynn | 704/226 |
| 6,415,253 | B1 | 7/2002 | Johnson | |
| 6,445,801 | B1 | 9/2002 | Pastor et al. | |
| 6,823,176 | B2 * | 11/2004 | Rogers | 455/67.13 |
| 7,478,043 | B1 * | 1/2009 | Preuss | 704/233 |
| 2003/0018471 | A1 | 1/2003 | Cheng et al. | |
| 2003/0033139 | A1 | 2/2003 | Walker | |
| 2006/0116874 | A1 * | 6/2006 | Samuelsson et al. | 704/228 |

FOREIGN PATENT DOCUMENTS

| | | |
|---|---|---|
| EP | 1 132 896 | 9/2001 |
| EP | 1 278 185 | 1/2003 |
| WO | WO 96/24127 | 8/1996 |

OTHER PUBLICATIONS

Vilnrotter et al., "Table look-up estimation of signal and noise parameters from quantized observables",In its The Telecommunications and Data Acquisition Report p. 104-113 (See N87-15329 07-32), Nov. 1986.*

"Speech Processing, Transmission and Quality Aspects (STQ); Distributed Speech Recognition; Advanced Front-End Feature Extraction Algorithm; Compression Algorithms", ETSI Standard, ETSI ES 202 050, vol. 1.1.1, pp. 1-45, (2002).

Citron et al., "Accelerating Multi-Media Processing by Implementing Memoing in Multiplication and Division Units", Proc. Int. Conf. on Architectual Support For Programming Languages and Operating Systems, XP-002287479, pp. 252-261, (1998).

Chaoui et al., "Implementation of a Car Handsfree Speech Enhancement Application on a TI TMS320C54x DSP", Acoustics, Speech and Signal Processing, IEEE, XP 010279499, pp. 3057-3060, (1998).

* cited by examiner

METHOD AND CIRCUIT FOR NOISE ESTIMATION, RELATED FILTER, TERMINAL AND COMMUNICATION NETWORK USING SAME, AND COMPUTER PROGRAM PRODUCT THEREFOR

CROSS REFERENCE TO RELATED APPLICATION

This application is a national phase application based on PCT/EP2003/012629, Filed Nov. 12, 2003, the content of which is incorporated herein by reference.

FIELD OF THE INVENTION

The present invention relates to techniques for noise estimation.

Specifically, the invention relates to techniques for determining, in a noise reduction process applied to a signal, for example a speech signal, affected by background noise, an update function relating a new value of estimated noise power ($P_{noise\_New}$) with a previous value of estimated noise power ($P_{noise}$).

The invention was developed by paying specific attention to the possible application to noise estimation in short time spectral amplitude methods, such as subtraction-type methods (also known as spectral subtraction methods).

Spectral subtraction is a method for enhancing the perceived quality of speech signals in the presence of additive noise such as ambient or background noise. Spectral subtraction encompasses a variety of related and derived methods.

The Wiener filter is exemplary of a filter implementing this type of methods and adapted for use with the invention, wherein the update function is a function of the previous estimated noise power ($P_{noise}$) and a mean input power spectral density ($P_{in\_PSD}$)

In the following, reference will thus be primarily made to a Wiener filter. Those of skill in the art will however appreciate that the invention is not limited to Wiener filters but applies in general to all those types of techniques that require noise estimation along the same lines of noise estimation in Wiener filters.

DESCRIPTION OF THE RELATED ART

Nowadays, users of cell phones require an ever-increasing number of service utilities and the number of functions available in cell phones is correspondingly increased. Voice recognition plays a key role as a means to improve the human being/machine interface and make the communication process easier.

In this context, ETSI (European Telecommunication Standards Institute) released a standard for a Distributed Speech Recognition System containing an Advanced Front-End Feature Extraction Algorithm intended to cope with background noise in a more robust manner (ETSI ES 202.050). A basic element distinguishing this standard over its predecessors is the Noise Reduction (NR) block: one of the main features of this block is the use of a Wiener filter.

The Wiener filter is the subject of extensive literature, as witnessed e.g. by the following patent documents that discuss the use of a Wiener filter for noise reduction in acoustic signals:

EP-A-1 278 185,

EP-A-1 132 896,

U.S. Pat. No. B-6,445,801,

U.S. Pat, No. B-6,415,253,

U.S. patent applications US 2003 033 139, and 2003 0018 471 A1.

Specifically, the noise reduction algorithm proposed in the ETSI standard is a combination of a two-stage Wiener filter with another processing technique whose features are of no momentum for the purpose of the instant application.

Based on the related theory, an input noisy signal passes through the two stages of the Wiener filter, that are similar but not identical, to produce a de-noised output signal. The transfer function of the filter in the frequency domain weighs the spectrum as a function of the signal-to-noise ratio (SNR) of the input signal. For that purpose, the algorithm uses noise estimation: this is developed as a function of time, the mean (or average) input signal power spectral density and the previously estimated noise power.

In the second filter stage, noise estimation is performed differently from the first stage, by using a complex function to calculate an "update" variable that should be multiplied by a previously estimated noise power figure to compute a new power figure.

Embedded systems, as used e.g. in mobile phone terminals, usually incorporate limited memory and processing resources. Real-time applications such as noise-reduction therefore impose strict time constraints on such embedded systems. For that reason a distributed approach is considered in the ETSI standard referred to in the foregoing.

In addition, for those applications, fixed-point notation is currently used in the place of floating-point notation since, e.g. i) the hardware of such embedded systems is mostly inadequate to support floating-point operation and ii) fixed-point notation is much faster to run, despite the loss in accuracy and some additional controls required.

For noise estimation of the second stage in a Wiener filter, three multiplications and two divisions are needed for each power sample and their equivalents in fixed-point notation must be implemented. These operations, and especially division, are very cumbersome to implement. Real-time systems therefore attempt to avoid such operations.

OBJECT AND INVENTION OF THE INVENTION

While quite a few well-known methods exist for computing a division result in fixed-point arithmetic, the need is still felt for arrangements that may permit fast and efficient noise estimation (e.g. according to the standard mentioned previously). This while retaining the possibility of operating with fixed-point arithmetic and striking a sensible balance between accuracy of the results and speed of computation, by acting on few parameters.

The object of the present invention is to satisfy the needs considered in the foregoing.

According to the present invention, that object is achieved by means of a method having the features set forth in the claims that follow. The invention also relates to a corresponding circuit and encompasses a noise reduction filter and a communication terminal including such a circuit, a communication network comprising such a terminal, and a computer program product loadable in the memory of at least one computer and comprising software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one" computer is obviously intended to highlight the possibility for the arrangement of the invention to be implemented in a de-centralized fashion.

A preferred embodiment of the invention is thus a circuit for determining, in a filter for noise reduction in a signal, such as a speech signal, affected by background noise, an update function relating a new value of estimated noise power with a previous value of estimated noise power. The update function is a function of the previous estimated noise power and a mean input power spectral density, and the circuit includes a look-up table having stored therein values for the update function as well as an input module for a current value for the mean input power spectral density. Search circuitry is associated with the look-up table for selectively searching values for the update function in the look-up table using the previous value of estimated noise power and the current value for the mean input power spectral density as a first and a second entry for the search.

Preferably, the search circuitry is configured for performing the search in the look-up table on the basis of an index computed starting from the first and second search entries.

Such an arrangement takes advantage of the fact that the contour lines of the expression used for noise estimation e.g. in the second stage of a Wiener filter are essentially straight lines with the origin at the zero and variable angular coefficients.

In such a preferred embodiment, the value of the "update" variable can thus be calculated as a function of the angle formed in a corresponding surface by the average input power spectral density and the noise power estimated previously, the value for the "update" variable being essentially constant for that given angle.

The arrangement described herein thus dispenses with complex operations such as division by substituting therefor simple and fast addition, subtraction and shift operations. This without any appreciable loss in terms of accuracy of the results.

The arrangement described herein also strikes a reasonable balance in terms of accuracy of the results obtained and computational effort, thus achieving a great efficiency in different specific implementations.

A preferred application of the arrangement described herein is speech processing in a Wiener filter as defined by the ETSI Standard ES 202.050 (oftentimes referred to as "Aurora" standard).

A particularly preferred application is noise reduction for speech processing in mobile/embedded terminals. These applications require low cost/real time equipment, and benefit from the fine-tuning of accuracy of the results and the speed of computation offered by the arrangement described herein.

The invention therefore fulfills the need for arrangements that permit fast and efficient noise estimation, while retaining the possibility of operating with fixed-point arithmetic and a good flexibility in balancing accuracy of the results and speed of computation, by acting on few parameters.

BRIEF DESCRIPTION OF THE ANNEXED DRAWINGS

Figure 2:
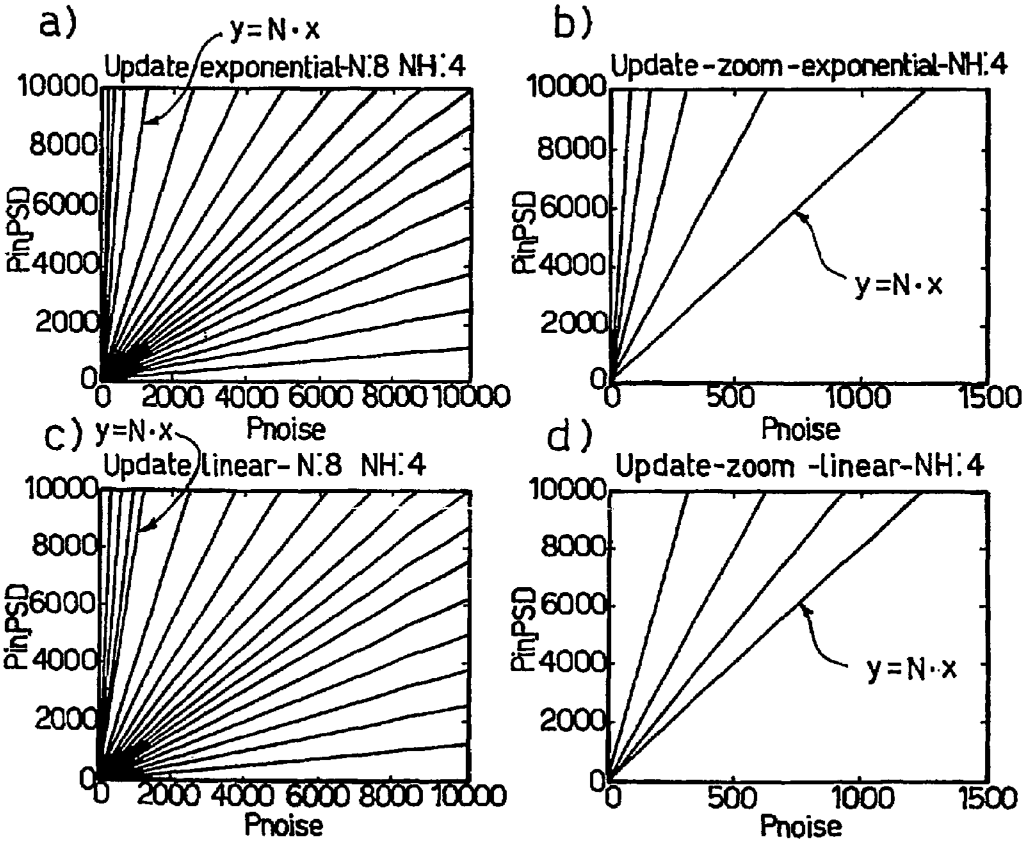
Figure 3:
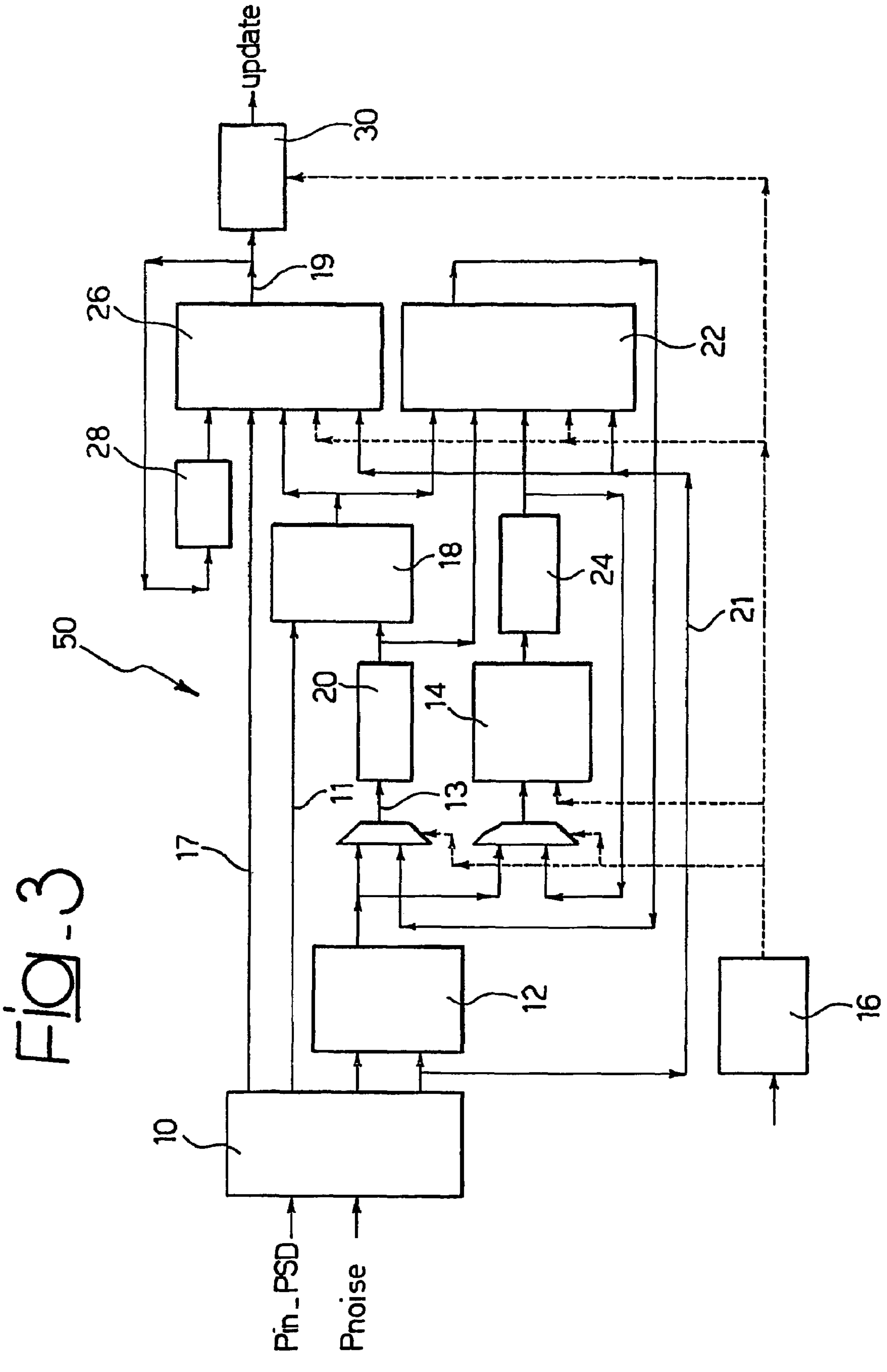
Figure 4:
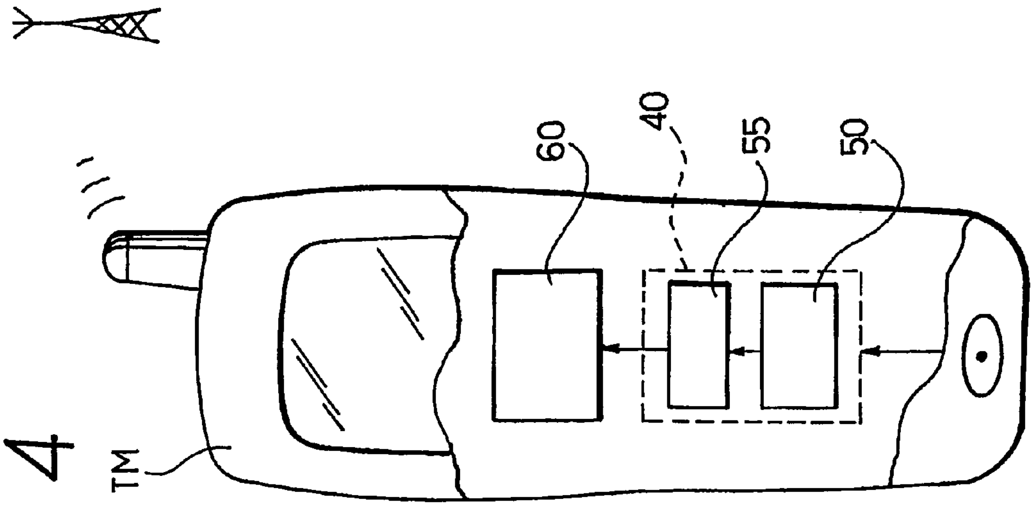
Figure 6:
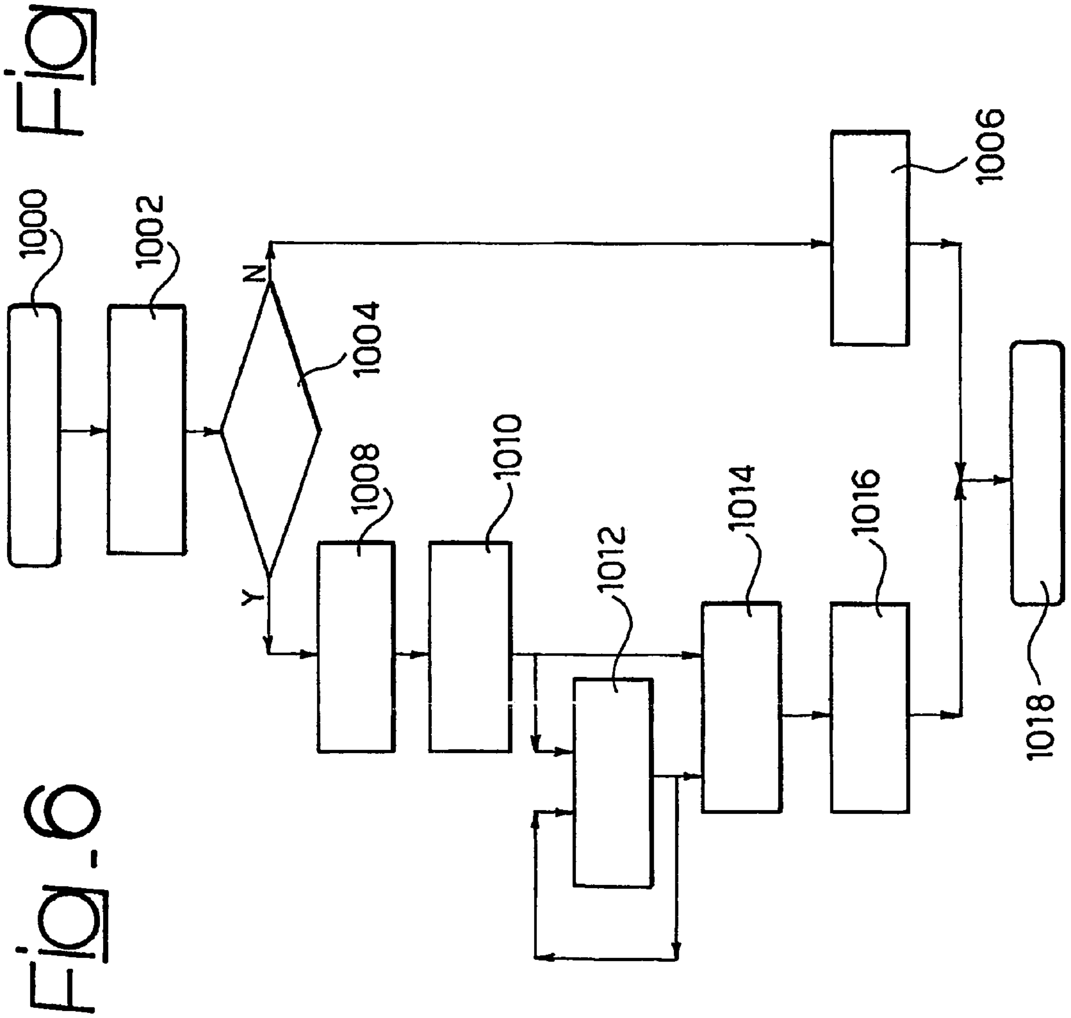
Figure 5:
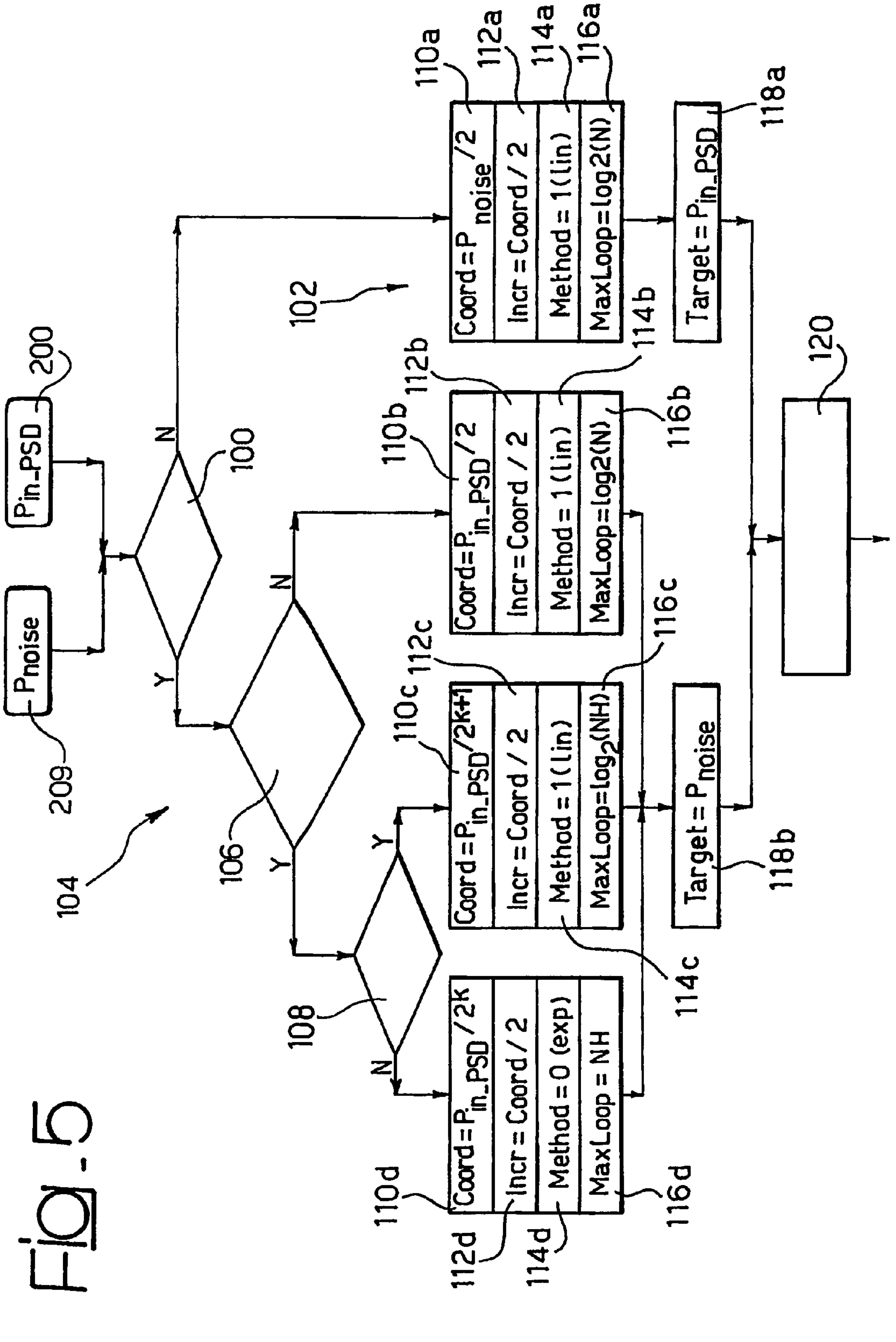
Figure 7:
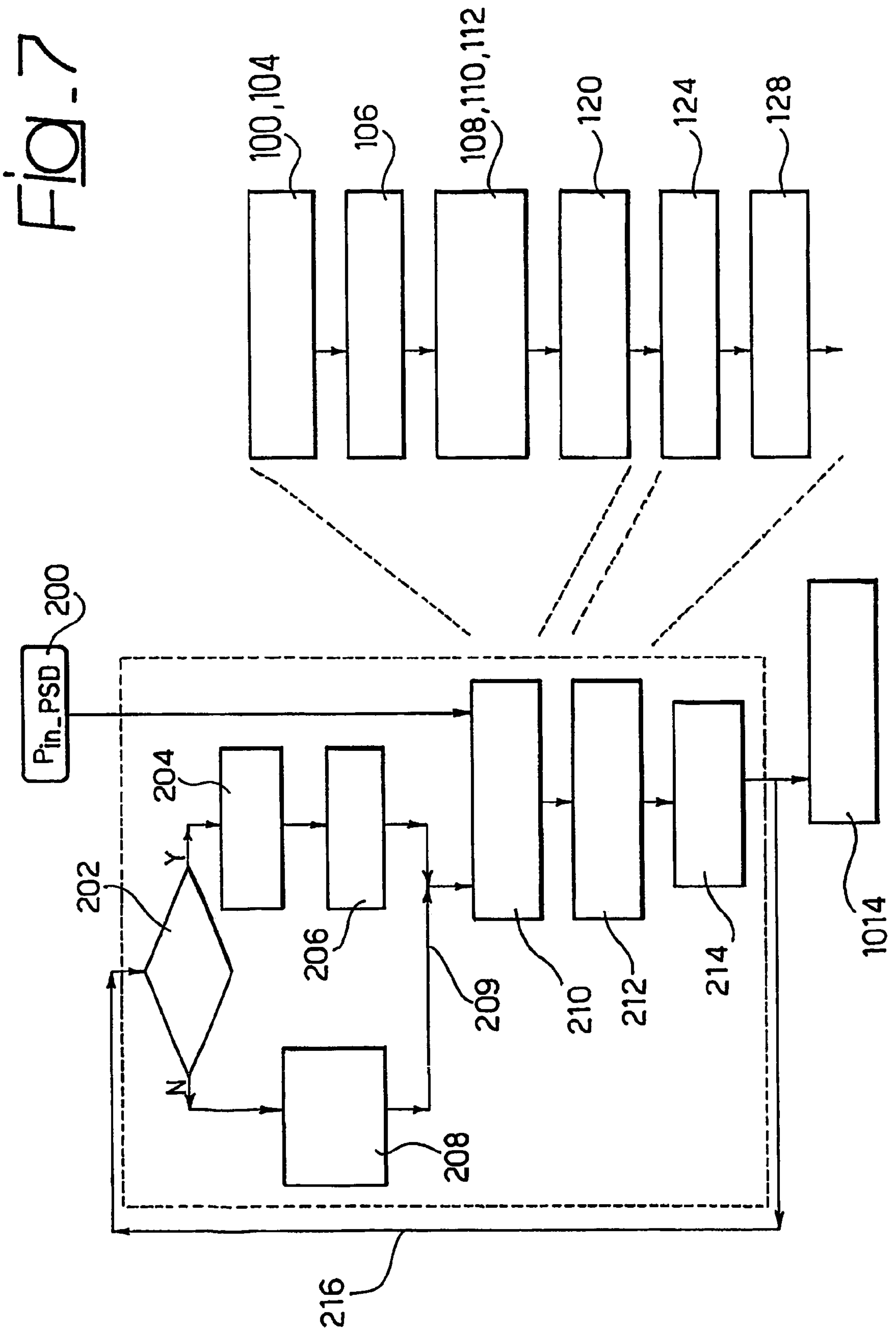

The invention will now be described, by way of example only, with reference to the annexed figures of drawing, wherein:

FIG. 1 shows the contour lines of a function as determined computed in the arrangement shown herein, FIG. 2, comprising four diagrams designated 2*a* to 2*d*, respectively, shows various alternative arrangements for determining the function shown in FIG. 1, FIG. 3 is a block diagram of the arrangement described herein, FIG. 4 shows the possible application of the arrangement of FIG. 3 within the framework of a mobile terminal in a communication network, and FIGS. 5, 6 and 7 are block diagrams detailing operation of the arrangement shown herein.

DETAILED DESCRIPTION OF PREFERRED EMBODIMENTS OF THE INVENTION

An exemplary embodiment of the arrangement described herein will now be detailed by referring to a preferred application to a computationally critical part of a Wiener filter used in noise reduction for speech processing.

Specifically, reference will be made—by way of example—to the procedures defined in the standard designated ETSI ES 202.050 v 1.1.1 (2002-10) Speech processing, transmission and Quality aspects (STQ); Distributed Speech recognition; Advanced front-end feature extraction algorithm; Compression algorithms The arrangement described herein performs noise estimation, by means of the so-called "update" function in the Wiener filter. This is defined by equations 5.10 of ETSI Standard ES 202.050 and represents the most complex part of the Wiener filter. This is essentially related to the need of performing complex operations, such as divisions and multiplications, which are rather heavy to perform in terms of computational load.

By way of theoretical introduction, the "update" function of the Wiener filter is computed in the second stage of noise reduction and is described in analytical form by the following equation:

$$\text{update} = 0.9 + 0.1 \cdot \frac{P_{\text{in\_PSD}}}{P_{\text{in\_PSD}} + P_{noise}} \cdot \left(1 + \frac{1}{1 + 0.1 \cdot \frac{P_{\text{in\_PSD}}}{P_{noise}}}\right) \tag{1}$$

where $P_{in\_PSD}$ is the mean (average) input power spectral density, $P_{noise}$ is the previously estimated noise power.

The entity designated "update" is used in periodically computing a new value of estimated noise power, $P_{noise\_New}$, (related to the samples transmitted in the current time interval), in the second stage of the Wiener filter.

Specifically, the following relationship applies:

$$P_{noise\_New} = \text{update} \cdot P_{noise} \tag{2}$$

In principle, well known methods exist for replacing complex arithmetic operations (e.g. division) with fixed-point algorithms that require simpler operations such as shifts, additions and subtraction. Direct verification shows that these methods are not efficient for certain specific computations as those required by the "update" function represented by the relationship (1) above.

Even without wishing to be bound to any specific theory in that respect, Applicants have reason to believe that this inefficiency is intrinsically related to the nature of the processes involved, namely the stochastic processes represented by the signal, in particular a speech signal, and the ambient (or background) noise signal. Specifically, the variables $P_{in\_PSD}$ and $P_{\_noise}$ can assume a wide range of values, and both their values and their ratio cannot be represented with high precision in fixed-point arithmetic and requires an expensive dedicated floating-point unit. Additionally, the known methods referred to in the foregoing require the use of algorithms that, in addition to being cumbersome, do not permit control of the accuracy of the results and of the complexity of computation.

The arrangement described herein is based on the unexpected recognition of the following.

While militating against the effectiveness of well known methods for replacing complex arithmetic operations with simpler fixed-point operations, the very nature of the speech signal and the ambient (or background) noise and of the "update" function makes it possible to replace the entire expression for the "update" function with simple processing steps having associated a minimum effort of computation while preserving a high accuracy in the final results.

In fact, the applicability of the arrangement described herein is in no way limited to the definition of the update function provided by formula (1) reported in the foregoing.

Those of skill in the art will thus promptly appreciate that, while demonstrated in the following with specific reference to the relationship (1) above, the arrangement described herein is applicable to any "update" function—even if different from the relationship (1) above—that is adapted to calculate, (for instance in a spectral subtraction filter or a Wiener filter), a new value of estimated noise power, $P_{noise\_New}$, referred to the samples transmitted in the current time interval (these samples having a mean power spectral density $P_{in\_PSD}$), starting from a previously estimated noise power, i.e. $P_{noise}$, when such function is in the generic form:

$$\text{update} = f\left(\frac{P_{\text{in\_PSD}}}{P_{noise}}\right) \quad (1.a)$$

where $f(\,)$ is a generic function of the ratio $P_{in\_PSD}/P_{noise}$, without any limitation about its complexity. The ratio $P_{in\_PSD}/P_{noise}$ is also known as "Signal to Noise Ratio" or SNR, and equation (1.a) can also be written in the equivalent form:

$$\text{update}=f(SNR) \quad (1.b)$$

For instance, the previous equation (1) belongs to the set of functions (1.a) because it can be rewritten as:

$$\text{update} = 0.9 + 0.1 \cdot \frac{\frac{P_{\text{in\_PSD}}}{P_{noise}}}{\frac{P_{\text{in\_PSD}}}{P_{noise}} + 1} \cdot \left(1 + \frac{1}{1 + 0.1 \cdot \frac{P_{\text{in\_PSD}}}{P_{noise}}}\right) \quad (1.c)$$

or in an equivalent form as:

$$\text{update} = 0.9 + 0.1 \cdot \frac{SNR}{SNR + 1} \cdot \left(1 + \frac{1}{1 + 0.1 \cdot SNR}\right) \quad (1.d)$$

By considering (as a non limiting example) the relationship (1), equivalent to (1.c) and (1.d) above, one can demonstrate that, as a two-variable function, dependent on $P_{in\_PSD}$ and $P_{noise}$, the function in question, or any analogous function that can be expressed in the form (1.a), describes a surface that have contour lines represented by straight lines (with different angular coefficients and non-uniform spacing) having origin at the intersection of the axes. The update values corresponding to these contour lines are not subject to specific restrictions. The contour lines of this surface are shown in FIG. 1.

The arrangement described herein provides for partitioning this surface in constant-value regions separated by straight lines with well-known angular coefficients. Of course, the only significant quadrant is the one that have both $P_{in\_PSD}$ and $P_{noise}$ positive, because these values are the powers of physical signals and cannot assume negative values.

Instead of being calculated analytically (with the associated computational load), the values for "update" can thus be simply searched in a predefined table such as a look-up table (LUT) addressed by means of an index value that unambiguously identifies one of the angular regions defined in the foregoing. The index value in question is defined on the basis $P_{noise}$ and $P_{in\_PSD}$ that represent a first and a second entry for the search. Each region in the surface is related to a pre-calculated "update" value that minimizes the maximum error.

An increased number of regions will result in higher accuracy, while also requiring a larger look-up table and more iterations to find the correct region.

In embedded software/hardware design, a trade-off needs to be reached between memory requirements, speed of computation and precision, and an optimal configuration reaches such a trade-off.

Deeper analysis of FIG. 1 shows that in that portion of the surface where $P_{in\_PSD}$ is high and $P_{noise}$ is low, the contour lines are very close to each other. This means that in that portion there is a more evident and steep variation of the "update" function in comparison with the other portions of the surface.

A two-step approach may thus be devised comprised of a general approximation for the whole surface and a more refined search for the more critical, steeper area. That area is usually a very populated area (many significant points in it), as the signal is much higher than the noise, and therefore deserves a special attention.

The first approximation step, used over the whole surface, takes a parameter N and divides the surface into 2·N angular regions, which are the areas between the straight lines:

$$y=j\cdot x/N \text{ when } P_{in\_PSD}<P_{noise}$$

$$y=N\cdot x/j \text{ when } P_{in\_PSD}>=P_{noise} \quad (3)$$

with j assuming the integer values from 1 to N, with $P_{noise}$ plotted on the X-axis and $P_{in\_PSD}$ on the y-axis (as shown in the FIGS. 1 and 2).

This is essentially a linear approximation, since the intervals between the lines on the y-axis for the first group of lines, or on the x-axis for the second group, are constant and their value is always x/N or y/N, respectively.

Another approximation is essentially an exponential approximation and can be used as an alternative to the one described previously in order to obtain a good approximation of the "update" function, especially in the critical area. The line with the higher angular coefficient (slope) traced by the linear approximation in the whole surface is the line y=N·x and the approximation in the critical area subdivides the region included between that line and the y-axis in a plurality of sub-regions. For this critical area another parameter, NH, is used, independent from N.

Within the critical area, any of the two approximations, linear or exponential, can be used. The choice depends on the specific formulation of the update function that in its generic formulation is expressed in the form (1.a).

Using the linear approximation again here, there will be more NH sub-regions in this critical area, which are determined by the lines with equation:

$$y=NH\cdot N\cdot x/j \quad (4)$$

with j from 1 to NH−1, integer values.

Using the exponential method, there will more NH+1 sub-regions inside that region, determined by the lines with equation:

$$y=2^j \cdot N \cdot x \qquad (5)$$

with j assuming the integer values from 1 to NH.

The diagrams of FIGS. 2*a* to 2*d* reproduce the function of FIG. 1 by further highlighting the position of the line y=N·x.

As indicated, such line partitions the surface representative of the function into two regions or areas where two different approximation methods may be used.

Specifically, FIG. 2*a* refers to an embodiment where a linear approximation is used for the area on the right hand side of the line y=N·x. Conversely, in the remaining—critical—portion on the left hand side of the line y=N·x the exponential approximation expressed by formula (5) above is used. This is better appreciated by referring to FIG. 2*b*, which is a reproduction of the critical area in question wherein the abscissa scale has been expanded.

FIG. 2*c* shows an embodiment where a linear approximation is again used for the area on the right hand side of the line y=N·x. In this case, for the remaining—critical—portion on the left hand side of the line y=N·x a linear approximation as expressed by formula (4) above is used. This is again better appreciated by referring to FIG. 2*d*, which is a reproduction of the critical area in question wherein the abscissa scale has been expanded.

Formulas (4) and (5) are not by themselves mutually exclusive: in fact they can be used concurrently, by further partitioning the "critical" area considered in the foregoing into sub-areas. For each sub-area either of the two formulas can be used, by defining respective independent values for NH, namely NH1 ed NH2.

In connection with the specific formulation (1) (or its equivalent (1.c), handling the critical zone as a single zone is generally satisfactory. In the case of the formulation (1.a), applying different approximation methods may be advantageous. The area of major interest being in any case the area where the steepest changes in the update function are located.

A practical implementation of the arrangement described herein is explained in detail in the following.

A circuit architecture adapted to compute the "update" function of the Wiener filter (according to the ETSI "Aurora" Standard) is shown in FIG. 3.

The architecture of FIG. 3, indicated as a whole as 50, is suitable to be included (FIG. 4)—in a manner known per se e.g. as an embedded system associated—in a noise reduction block 40 that also contains a noise subtraction filter or a Wiener filter 55 and in turn associated to speech processing apparatus 60.

Such apparatus—known per se—may be included in the Speech recognition Front-End of a system (e.g. according to the ETSI ES 202.050 standard), associated with a mobile terminal TM in a mobile communication network. All the information signals processed therein can be represented using a fixed-point notation.

In the following, a set of speech signal samples (as transmitted e.g. in a 10 ms time interval) will be identified as a "frame".

Corresponding processing steps will now be described by referring primarily to the block diagram of FIG. 3 while also referring to the flow charts of FIGS. 5 to 7.

Specifically, the following description represents the entire flow of FIG. 5, including a binary search (block 120 of FIGS. 5 and 7) and the functions for determining an index as used for addressing a look-up table (blocks 124 and 128 in FIG. 7). In practice, all the functions on the right hand side of FIG. 7 coincide with the blocks 210 e 212 reproduced in the left hand side of FIG. 7. For the sake of simplicity, FIG. 3 groups in a single block some functions shown separately in FIGS. 5 e 7.

The input information that is processed consists of:

- $P_{in\_PSD}$, or Mean Power Spectral Density, produced—in a manner known per se—using the data sample in the current frame and in the previously transmitted frame (block 200 in FIG. 5);
- $P_{noise}$, or Noise Spectrum Estimate, referred to the samples transmitted in the previous time interval (block 209 in FIG. 5).

The two power values (unsigned values) are compared in a Value Switch Compare block 10, and the result of the comparison is used (in a step 100) to select one of two sections of the "update" function projection to apply the interpolation. The two sections correspond respectively to the graph areas with $P_{in\_PSD}<P_{noise}$ (see 102 in FIG. 5) and with $P_{in\_PSD}>P_{noise}$ (104 in FIG. 5); each of these sections is subsequently divided into angular regions (see equations 3).

The larger of the Mean Power Spectral Density and the Noise Spectrum Estimate is then used to compute a first coordinate ("Coord") in a Compute First Coord block 12. This is essentially done in steps 110*a* to 110*d* in FIG. 5 (steps 106 and 108 will be detailed in the following).

The simplest way to perform this operation is a 1-position right shift in a fixed-point arithmetic (corresponding to a division by 2 steps 110*a*, 110*b*); the value obtained becomes the first coordinate and is used to compute (steps 112*a* to 112*d* of FIG. 5) the first value of the "Increment" variable, the latter operation being performed in a Compute New Increment block 14.

The two quantities "Coord" and "Increment" are used to find a region defined by two contour lines that approximate the value of the "update" function. As shown previously, the contour lines of the "update" function are straight lines having their origin at the intersection of the axis ($P_{in\_PSD}$, $P_{noise}$); such property is used to find an approximation of the "update" function, defining angular regions and using a fast search performed on one of the two input quantities, $P_{in\_PSD}$ and $P_{noise}$.

As indicated, in order to compute the best approximation of the "update" function, initially two sections are identified: $P_{in\_hd\ PSD}>P_{noise}$ and $P_{in\_PSD}<P_{noise}$ (102 and 104, respectively, in FIG. 5); after the definition of the section, the angular regions of equations (3) are considered in performing the search for the best approximation for the "update" value.

A binary search (or an equivalent search procedure) is then applied to modify the "Coord" value by a quantity equals to the "Increment" variable. Such operations are iterated a number of times defined by an Iteration Counter block: the simplest implementation of this block is a counter that will count the number of cycles needed by the search algorithm to find the region that leads to the best approximation of the "update" function value. Each value of the Iteration Counter 16 will thus correspond to a cycle of the search algorithm. The Iteration Counter 16 is also used to select the first value of the "Coord" and "Increment" values (i.e when Iteration Counter=0) for any new frame.

The lower value of the Mean Power Spectral Density and the Noise Spectrum Estimate becomes a "Target" value (11), blocks 118*a* and 118*b* in FIG. 5 and the purpose of the search is to find the angular region that contains this value. At each cycle, a comparison is carried out between the "Coord" value (line 13 in FIG. 3) and the "Target" value (line 11 in FIG. 3) in a compare block 18; this comparison allows iterating a convergence of the "Coord" value toward the Target, updating accordingly the "Coord" value.

The compare block 18 is used to determine if the value of "Coord" (stored in a Store Coord block 20) is strictly less than, greater than or equal to the "Target" value (line 11 in FIG. 3).

The convergence is achieved in a Compute New Coord block 22 in FIG. 3.

The values of "Coord" (as stored in a block 20) and "Increment" (as stored in a Store Increment block 24) as well as the output of the Compare block 18 are used into the Compute New Coord (block 22) to compute the new value of "Coord" for the next cycle.

The value of the Iteration Counter (block 16) is also considered in order to stop the operations when the maximum number of iterations (steps 116*a*-116*d* in FIG. 5) has been reached.

In its simplest form, the Compute New Coord block 22 will add or subtract "Increment" to "Coord" according to the output of the Compare block 18. The value of "Increment" is decreased (usually divided by two, using a 1-bit right shift) at each cycle, through the Compute New Increment block 14.

This procedure is used for the linear approximation, obtained applying equations (3) and (4).

As indicated, a different way of computing "Coord" for the next cycle is the exponential approximation.

In that case the block 22 sets the new value of "Coord" (line 13 of FIG. 3) equal to "Increment", instead of adding or subtracting "Increment" from the "Coord" value. In that case the search function can stop before reaching the maximum number of iterations, depending on the result of comparison between "Coord" and "Target", typically as soon as "Coord" is less than "Target". Such procedure is used for the exponential regions definition, obtained applying equation (6).

At each iteration, the output of the Compare block 18, is sent to the Compute Index block 26. This block (26) also receives the output of the Iteration Counter block 16, used to start and stop the computation for any new Frame, and the output 17 of Value Switch Compare block 10 (that is the result of the comparison $P_{in\_PSD}>P_{noise}$), used at the Iteration zero.

This information is used to recursively compute an "Index" value; inputting them to a Compute Index block 26 thus contributes to build a portion (tipically a bit) of "Index" value at each iteration. This "Index" value (line 19 in FIG. 3) unambiguously identifies the angular region that gives the best approximation of the "update" function.

In its simplest form, the Index is a binary word of L bits, the number of regions used in the interpolation process being equal or less to $2^L$. Each bit of this word will then correspond to a result of the Compare block 18 or of the Value Switch Compare block 10, available on line 17 in FIG. 3 (that is the result of the comparison $P_{in\_PSD}>P_{noise}$) during each of the cycles executed by the search procedures.

The partial determined value for Index at each iteration is stored in a Store Index block 28.

When the search procedures are completed, according to the Iteration Counter 16 (for the linear approximation) or the output of the Compare block 18 (for the exponential approximation), the final value of "Index" is used to access a table (represented by a LUT memory block 30 in FIG. 3).

The LUT Memory 30 returns the approximated value of the "update" function for the region unambiguously identified by the "Index" value.

By resorting to the architecture shown in FIG. 3 the procedure for computing the "update" functions can be completed using only shift, addition, subtraction and comparisons steps of binary values expressed in fixed-point notation.

Complex operations are avoided and computation is speeded up, while the accuracy of the final result can be easily controlled. The error in the approximation is controlled by the number of regions used in the search procedures; a trade-off between speed and accuracy (or complexity of the logic implementation) can be achieved acting on the number of regions which directly defines the total number of cycles required to compute the final "Index" value, thus to retrieve the approximated value of the "Update" function.

In order to achieve the best results with a minimum computation effort, various search functions can be implemented to refine the result at the desired accuracy.

One solution that leads to a high accuracy without having to consider an excessive number of regions, is to find a first approximation by using few angular regions, then to refine the result applying a more accurate search inside the region found. Such an approach is focused on the angular regions that contain a bigger number of contour lines of the "update" function. Experimental analysis may permit to locate nearly optimal regions sizes that effectively do not lead to loss of performance in the application.

For Wiener filter design, such analysis can be done at the output of the filter or preferably at the output of the Noise Reduction Filter that includes a Wiener Filter implementing the equations (1) and (2).

Experimentation has shown that the approximation of the region with the highest $P_{in\_PSD}/P_{noise}$ ratio is critical in terms of the result accuracy; at the same time, such a "critical region" has the highest gradient of the "update" function. To improve the quality of the results, the approximation method is refined inside this critical region.

A nearly optimal trade-off between accuracy and computation effort is found by applying the previously described approach using two distinct angular regions definitions: in a first phase, a region is found; if the result is the region with the highest $P_{in\_PSD}/P_{noise}$ ratio, then a refining step is applied, searching a better approximation using more dense sub-regions. This second phase can use a different search function, for instance using exponential approximation, instead of the linear one.

A fast and accurate implementation is obtained defining:

$$N=2^K \tag{6}$$

N being the number of angular regions for each of the 2 semi-areas, respectively identified by $P_{in\_PSD}>P_{noise}$ and $P_{in\_PSD}<P_{noise}$, and K any positive integer value.

The search procedure uses the linear approximation method previously described. Using this method, the critical region is easily identified by the relationship:

$$P_{in\_PSD}>P_{noise}*2^K \tag{7}$$

This region definition (that lead to the other result in step 106 of FIG. 5) is especially advantageous, because it allows using binary shifts instead of multiplication, with a fixed-point arithmetic.

As a consequence, the comparison $P_{in\_PSD}>P_{noise}*2^K$ is performed in the Value Switch Compare block 10 (in addition to the comparison $P_{in\_PSD}>P_{noise}$). According to the result of these comparisons, the Compute First Coord block 12 will execute the operation $P_{in\_hd\ PSD}/2^K$ (performed as a right shift of N positions in step 110*d*) or a simple 1 bit right shift (division by 2 steps 110*b*) to compute the initial "Coord" value with a fixed-point notation.

The result of the comparison $P_{in\_PSD}>P_{noise}*2^K$ is also forwarded to the Compute Index block 26 and Compute New Coord block 22. These can thus apply different search procedures if the "update" function value belongs to the critical region.

The overall computing resources required for properly managing the critical region are thus moderate, while the accuracy can be easily controlled, defining NH dense sub-regions inside the critical region, with NH being totally independent from N.

Approximation within the critical region can be carried out using the linear or the exponential approximations previously described. If the linear approximation is used also in the critical region (depending on the outcome of step 108 in FIG. 5), then the most efficient definition of NH is:

$$NH=2^P \tag{8}$$

being P any positive integer value, independent from K.

Due to the similarity with expression (6), the search function applied to sub-regions in the critical region is the same as the procedure applied to search any other region.

If exponential approximation is used, NH can be any positive integer value; in such case the architecture of FIG. 3 is still valid and, within each cycle, the only difference is in the operation executed by the Compute New Coord block 22, as previously explained.

The architecture proposed in FIG. 3 is thus adapted to perform different operations in the Compute First Coord block 12 and Compute New Coord block 22, according to the identification step of the critical region (see equation 7) carried out in the Value Switch Compare block 10, and transmitted with a signal over a line 21 of FIG. 3.

Effectiveness of the arrangement described herein can be tested by comparing the total frame noise energy variable on a time scale, for a reference model, obtained in a traditional manner (using divisions), and for the arrangement described herein, which only uses simple operations.

In this way, it is possible to observe that the noise energy, computed from equations (1) and (2), is influenced by this approximated solution and validate the results over the estimated noise power. Experimentation shows that the arrangement described herein can be used for optimizing accuracy or the Look-up-table size and number of iterations.

A good trade-off was shown to be obtained with N=16 and NH=6 in the exponential mode.

Another advantage of the arrangement described herein lies in that it uses simple operations in a fixed-point arithmetic. This arrangement is thus ideally suitable for low-cost devices, such as embedded systems for consumer electronics and for low/moderate processing power, real time equipment, like those used for mobile communication, where a high level of accuracy can be obtained by using computation of low complexity.

FIG. 6 shows a practical application of the arrangement described herein to noise estimation within a voice sample processor, such as the noise reduction block included in the distributed speech recognition front end as defined by the ETSI 202.050 Standard.

After a start step 1000 and a step 1002 devoted to LUT and parameter initialization, voice samples are grouped over time intervals or slots (such group of data is also defined as a "frame").

The steps of FIG. 6 are thus repeated regularly for all the frames, at regular time intervals. In a step 1004, a check is made as to whether new signal samples, e.g. speech signal samples, are available for processing.

In the negative (no new samples available), a buffer flushing step 1006 is performed.

If, conversely, new samples are available, after a possible pre-processing step 1008 (of a known type), the value of $P_{in\_PSD}$ is determined in a step 1010.

Thereafter the parameter $P_{noise\_New}$ is estimated in a step 1012 as detailed in the following in connection with FIG. 7.

Thereafter, filtering (of any known type among the various techniques considered at the outset of the present description) is applied in a step 1014, and the filtered samples are buffered in a step 1016.

Step 1018 marks the end of processing for a given frame, and the sequence of steps described in the foregoing is then repeated for a new frame.

As indicated the new value for $P_{noise\_New}$ (valid for the present time interval), is determined based on the mean input signal power spectral density ($P_{in\_PSD}$) and the previous value of $P_{noise}$.

FIG. 7 shows the steps used to compute the new value of the noise power estimation $P_{noise\_New}$, by means of the computation of the "update" variable.

At the beginning of the Voice Stream (First Data Set, 202 in FIG. 7), the noise power estimation is initialized (step 204 in FIG. 7) and the parameters of the proposed algorithm are set (step 206 in FIG. 7). For all the subsequent frames, the previous noise power estimation is considered (step 208 in FIG. 7).

Such value (designated 209 in FIG. 7) is used, together with the value $P_{in\_PSD}$ (200 in FIG. 7), to find the best approximating region in the plane containing the contour lines of the "Update" function (210 in FIG. 7).

The identification of the region found is then used to retrieve the value of the "Update" function (212 in FIG. 7) in the look up table 130 of FIG. 3. The value of "Update" thus retrieved is used to compute the value of $P_{noise\_New}$ (214 in FIG. 7) that will be used in the next time interval (216 in FIG. 7).

These operations, as shown in the left-hand side of the flow chart of FIG. 7 are implemented through the instructions shown by the boxes on the right side of the same figure.

The most significant of those instructions are also shown in the flow chart of FIG. 5.

More specifically, following the flow of data processing, the approximating region is found by executing the following sequence of instructions:

i) select the X-Y section of the Update surface projection (100 and 104 in FIG. 7 and FIG. 5);

ii) check the positioning in the critical sub-region, depending on result of i) (operations 106 in FIG. 5);

iii) initialize the variable Coord (operations 110*x*) and Increment (operations 112*x*) according to parameters (linear or exponential approximation, 108) and the results of the previous instructions;

iv) perform a binary search is subsequently applied (120);

v) the region found is then associated to an index (124);

vi) such index is used to address (step 128) the table of values or LUT table 30 of FIG. 3.

Of course, without prejudice to the underlying principle of the invention, the details and embodiments may vary, also significantly, with respect to what has been described, by way of example only, without departing from the scope of the invention as defined in the claims that follow.

The invention claimed is:

1. A method of determining, in a noise reduction process applied to a signal affected by background noise, an update function relating a new value of estimated noise power ($P_{noise\_New}$) with a previous value of estimated noise power ($P_{noise}$), said update function being a function of said previous estimated noise power ($P_{noise}$) and a mean input power spectral density ($P_{in\_PSD}$), comprising the steps of:

providing a look-up table having stored therein values for said update function;

determining a current value for said mean input power spectral density ($P_{in\_PSD}$); and searching a corresponding value for said update function in said look-up table using said previous value of estimated noise power ($P_{noise}$) and said current value for said mean input power spectral density ($P_{in\_PSD}$) as a first and a second entry for said search.

2. The method of claim 1, comprising the steps of providing a look-up table having stored therein values for said update function, said update function being a function of a ratio of said mean input power spectral density ($P_{in\_PSD}$) and said previous estimated noise power ($P_{noise}$).

3. The method of claim 1, comprising the steps of performing said search in said look-up table based on an index computed starting from said first and second search entries.

4. The method of claim 1, wherein said values for said update function are stored in said look-up table as representative of a surface plotted against said first (x) and said second (y) entry, wherein said surface is partitioned in a plurality of regions each having a corresponding value for said update function, said constant value regions being separated by straight lines with known angular coefficients.

5. The method of claim 4, comprising the step of partitioning at least one portion of said surface in a plurality (2N) of angular regions, wherein said angular regions are selected from the areas between the straight lines:

$$y=j\cdot x/N \text{ when } P_{in\_PSD}<P_{noise}$$

$$y=N\cdot x/j \text{ when } P_{in\_PSD}>=P_{noise}$$

wherein j is an integer from 1 to N, and wherein said first and second entries for the search are plotted on the x and the y-axis, respectively.

6. The method of claim 4, wherein said first and second entries are plotted on the x-axis and the y-axis, respectively, and comprises the steps of subdividing said surface into:

a first portion between the line y =N.x and the x-axis, said first portion being subdivided on the basis of a linear approximation in a first plurality of regions wherein the lines partitioning said first plurality of regions define constant intervals therebetween at said x or y axis; and a second portion comprising the remaining portion of said surface, said second portion being subdivided on the basis of a linear approximation in a second plurality of regions wherein the lines partitioning said second plurality of regions are determined by the equation:

$$y=NH\cdot N\cdot x/j$$

wherein j is an integer from 1 to NH−1.

7. The method of claim 4, wherein said first and second entries are plotted on the x-axis and the y-axis, respectively, and comprises the steps of subdividing said surface into:

a first portion between the line y =N.x and the x-axis, said first portion being subdivided on the basis of a linear approximation in a first plurality of regions wherein the lines partitioning said first plurality of regions define constant intervals therebetween at said x or y axis, and a second portion comprising the remaining portion of said surface, said second portion being subdivided on the basis of an exponential approximation in a second plurality of regions wherein the lines partitioning said second plurality of regions are determined by the equation:

$$y=2^j\cdot N\cdot x$$

wherein j is an integer from 1 to NH.

8. A circuit for determining, in a filter for noise reduction in a signal affected by background noise, an update function relating a new value of estimated noise power ($P_{noise\_New}$) with a previous value of estimated noise power ($P_{noise}$), said update function being a function of said previous estimated noise power ($P_{noise}$) and a mean input power spectral density ($P_{in\_PSD}$), comprising:

a look-up table having stored therein values for said update function;

an input module for a current value for said mean input power spectral density ($P_{in\_PSD}$); and search circuitry associated with said look-up table for selectively searching values for said update function in said look-up table using said previous value of estimated noise power ($P_{noise}$) and said current value for said mean input power spectral density ($P_{in\_PSD}$) as a first and a second entry for said search.

9. The circuit of claim 8, wherein said look-up table has stored therein values for said update function being a function of a ratio of said mean input power spectral density ($P_{in\_PSD}$) and said previous estimated noise power ($P_{noise}$).

10. The circuit of claim 8, wherein search circuitry associated with said look-up table is configured for performing said search in said look-up table on the basis of an index computed starting from said first and second search entries.

11. The circuit of claim 8, wherein said values for said update function are stored in said look-up table as representative of a surface plotted against said first (x) and said second (y) entries, wherein said surface in said look-up table is partitioned in a plurality of regions each corresponding to a given constant value for said update function, said constant value regions being separated by straight lines with known angular coefficients.

12. The circuit of claim 11, wherein said at least one portion of said surfaces comprises a plurality (2N) of angular regions, wherein said angular regions are selected from the areas between the straight lines:

$$y=j\cdot x/N \text{ when } P_{in\_PSD}<P_{noise}$$

$$y=N\cdot x/j \text{ when } P_{in\_PSD}>=P_{noise}$$

wherein j is an integer from 1 to N, and wherein said first and second entries in the table are plotted on the x and the y-axis, respectively.

13. The circuit of claim 11, wherein said values for said update function are stored in said look-up table as representative of a surface plotted against said first (x) and said second (y) entries, wherein the surface in said look-up table is partitioned into:

a first portion between the line y =N.x and the x-axis, said first portion being subdivided on the basis of a linear approximation in a first plurality of regions wherein the lines partitioning said first plurality of regions define constant intervals therebetween at said x or y axis; and a second portion comprising the remaining portion of said surface, said second portion being subdivided on the basis of a linear approximation in a second plurality of regions wherein the lines partitioning said second plurality of regions are determined by the equation:

$$y=NH\cdot N\cdot x/j$$

wherein j is an integer from 1 to NH−1.

14. The circuit of claim 11 wherein said values for said update function are stored in said look-up table as representative of a surface plotted against said first (x) and said second (y) entries, wherein the surface in said look-up table is partitioned into:

a first portion between the line y =N.x and the x-axis, said first portion being subdivided on the basis of a linear approximation in a first plurality of regions wherein the lines partitioning said first plurality of regions define constant intervals therebetween at said x or y axis; and a second portion comprising the remaining portion of said surface, said second portion being subdivided on the basis of an exponential approximation in a second plurality of regions wherein the lines partitioning said second plurality of regions are determined by the equation:

$$y=2^j \cdot N \cdot x$$

wherein j is an integer from 1 to NH.

15. A filter comprising a circuit according to any one of claims 8-14 for estimating noise power.

16. The filter of claim 15, wherein said filter is a Wiener filter.

17. A mobile terminal comprising a filter according to claim 15, for noise reduction of speech signal.

18. A communication network comprising a mobile terminal according to claim 17.

19. A computer readable medium encoded with a computer program product loadable into a memory of at least one computer and comprising software code portions for performing the method of any one of claims 1-7.

* * * * *

UNITED STATES PATENT AND TRADEMARK OFFICE

CERTIFICATE OF CORRECTION

PATENT NO. : 7,613,608 B2
APPLICATION NO. : 10/579058
DATED : November 3, 2009
INVENTOR(S) : Bollano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Nineteenth Day of October, 2010

David J. Kappos

*Director of the United States Patent and Trademark Office*